United States Patent [19]

Sakurai et al.

[11] 4,034,561

[45] July 12, 1977

[54] EXHAUST REACTION ASSEMBLY FOR MULTI-CYLINDER INTERNAL COMBUSTION ENGINE

[75] Inventors: Yoshitoshi Sakurai, Niiza; Takao Okura, Saitama; Shoichiro Irimajiri, Kawagoe, all of Japan

[73] Assignee: Honda Giken Kogyo Kabushiki Kaisha, Tokyo, Japan

[21] Appl. No.: 644,110

[22] Filed: Dec. 24, 1975

[30] Foreign Application Priority Data

Dec. 30, 1974 Japan .................... 49-2193

[51] Int. Cl.² ........................................ F01N 3/10
[52] U.S. Cl. ................................... 60/282; 60/323
[58] Field of Search ............................ 60/282, 323

[56] References Cited

U.S. PATENT DOCUMENTS

| | | | |
|---|---|---|---|
| 2,257,631 | 9/1941 | Wahlberg | 60/323 |
| 3,413,803 | 12/1968 | Rosenlund | 60/282 |
| 3,924,863 | 12/1975 | Nakano | 277/235 |

Primary Examiner—Douglas Hart
Attorney, Agent, or Firm—Lyon & Lyon

[57] ABSTRACT

Each cylinder of an internal combustion spark ignition V-8 engine is provided with a main combustion chamber and an auxiliary combustion chamber connected by a torch opening. A lean air-fuel mixture is supplied to the main combustion chambers and a rich air-fuel mixture is supplied to the auxiliary combustion chambers. An exhaust reaction chamber assembly is positioned between the two banks of cylinders and is provided with a liner having a first reaction chamber therein. Four exhaust tubes each connected to receive exhaust gases from two adjacent cylinders project into the reaction chamber and each has a discharge end in close proximity and in substantial alignment with the discharge end of another exhaust tube so that exhaust gases discharged by each exhaust tube enter another exhaust tube and also enter into the first reaction chamber. The first reaction chamber discharges into an enclosing second reaction chamber from which heat is derived to vaporize both of the air-fuel mixtures.

6 Claims, 3 Drawing Figures

EXHAUST REACTION ASSEMBLY FOR MULTI-CYLINDER INTERNAL COMBUSTION ENGINE

This invention relates to internal combustion engines and is particularly directed to an improved exhaust reaction chamber assembly for oxidizing the pollutants HC and CO in the exhaust gases before they are discharged into the atmosphere. This invention is particularly well suited for use with an engine having two banks of cylinders arranged in the shape of V, and in which each cylinder has a main combustion chamber and an auxiliary combustion chamber connected by a torch opening. A lean air-fuel mixture is supplied to the main combustion chambers and a rich air-fuel mixture is supplied to the auxiliary combustion chambers. A spark plug is provided to ignite the mixture in each auxiliary combustion chamber and the flame thus produced projects through the torch opening to burn the lean mixture in the main combustion chambers. The overall air-fuel ratio is leaner than the stoichiometric ratio, with the result that there is an excess of oxygen in the exhaust gases.

The exhaust reaction chamber assembly is positioned between the two banks of cylinders and serves to maintain the burning exhaust gases at a relatively high temperature for a relatively long residence time to promote the oxidation reactions of both HC and CO.

In accordance with this invention, a thin wall metallic liner having a first reaction chamber therein is enclosed and surrounded by a metallic shell which defines a second reaction chamber therein. A plurality of exhaust tubes each connected to receive exhaust gases discharged from two adjacent cylinders project through the shell and liner into the first reaction chamber. Each exhaust tube has a discharge end in close proximity and in substantial alignment with the discharge end of another exhaust tube so that the exhaust discharged by each exhaust tube enter another exhaust tube and also enter into the first reaction chamber. The first reaction chamber discharges into the second reaction chamber where a portion of the gases are used to heat both of the intake mixtures to insure vaporization.

Other objects and advantages will appear hereinafter.

Figure 1:
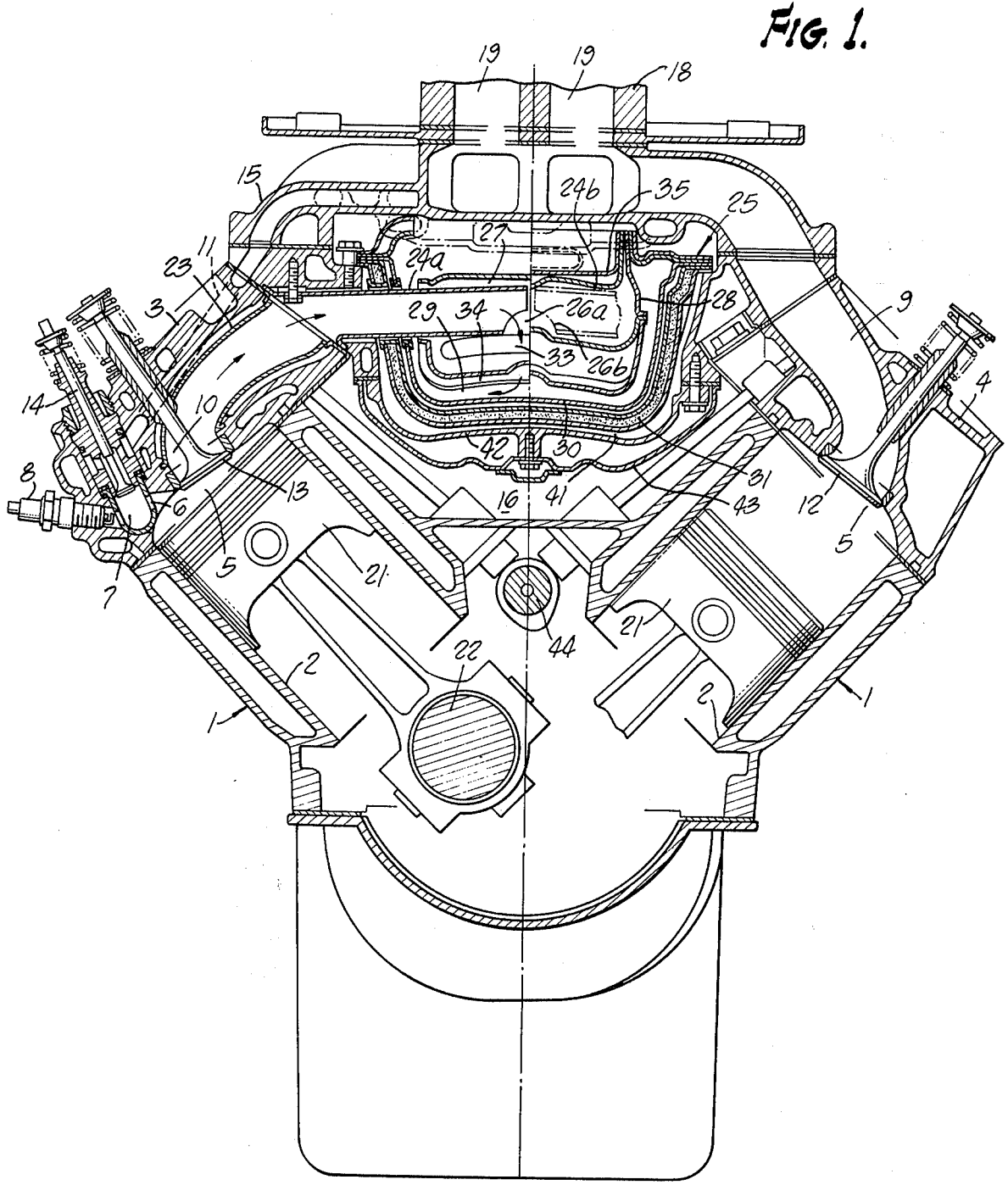
FIG. 1 is a transverse sectional elevation showing a preferred embodiment of this invention.

The V-type engine has two banks of cylinders 2 arranged in the shape of the letter V. Cylinder heads 3 and 4 cooperate with the engine block 1, cylinders 2 and pistons 21 to form main combustion chambers 5. An auxiliary combustion chamber 7 is provided for each main combustion chamber 5, and is connected thereto by a torch opening 6. Each main combustion chamber 5 is provided with a main intake valve 12 and an exhaust valve 13. Each auxiliary combustion chamber 7 is provided with an auxiliary intake valve 14. These valves are all operated by cam shafts 44 driven in timed relation with a crank shaft 22. A spark plug 8 is provided for each auxiliary combustion chamber 7. Each intake valve 12 controls flow of relatively lean mixture from a main intake port 9 into a main combustion chamber 5. Similarly, each exhaust valve 13 controls flow of exhaust gases from a main combustion chamber 5 into an exhaust port 10. Each auxiliary intake valve 14 controls flow of relatively rich mixture through an auxiliary intake port 11 to an auxiliary combustion chamber 7.

An exhaust reaction chamber assembly generally designated 25 is positioned in the space 16 between the two banks of cylinders 2 and beneath the intake manifold 15. The intake manifold 15 has passages leading to the main intake ports 9 and auxiliary intake ports 11. A carburetor 18 is mounted on the intake manifold 15 and is provided with main barrels 19 for supplying a lean air-fuel mixture and is provided with an auxiliary barrel 20 for supplying a rich air-fuel mixture. The barrels 19 and 20 communicate with the main and auxiliary intake ports 9 and 11 by way of intake passages formed in the intake manifold 15.

During the suction stroke of each piston 21 a lean mixture from the main barrels 19 passes through the intake manifold 15 and into the main intake port 9, through the open intake valve 12 and into the main combustion chamber 5. At the same time, rich mixture is supplied through the intake manifold 15 into the port 11 and through the auxiliary intake valve 14 into the auxiliary combustion chamber 7. At the end of the compression stroke of each piston, the electrodes of the spark plug 8 ignite the mixture in the auxiliary chamber 7, and the flame is projected through the torch opening 6 to burn the mixture in the main combustion chamber 5. The overall air-fuel ratio is leaner than the stoichiometric ratio. As a result, the exhaust gases contain excess oxygen, and the oxidizing of hydrocarbons and carbon monoxide continues during the power stroke and exhaust stroke and continues within the exhaust reaction chamber assembly 25.

In accordance with the present invention, the exhaust gases thus discharged from each main combustion chamber 5 pass through the exhaust port liner 23 in one of the cylinder heads 3, 4, and then pass into a connecting exhaust tube 24a, 24b, 24c, 24d which projects into the interior of the exhaust reaction chamber assembly 25. Each exhaust tube is oblong in cross section and is connected to receive exhaust gases from two adjacent exhaust ports 10. Thus, the four exhaust tubes 24a, 24b, 24c, and 24d accommodate exhaust gases from all eight cylinders of the engine. The four exhaust tubes are of similar but not identical construction. The exhaust tubes 24a and 24b have discharge openings 26a and 26b, respectively, in substantial alignment. Similarly, exhaust tubes 24c and 24d have discharge openings 26c and 26d, respectively, in substantial alignment. When a pulse of exhaust gas passes into any one of the exhaust tubes, the pulse is delivered into the first chamber 27 within a thin wall metallic liner 28 and also into the confronting exhaust tube through the aligned discharge openings.

Figure 2:
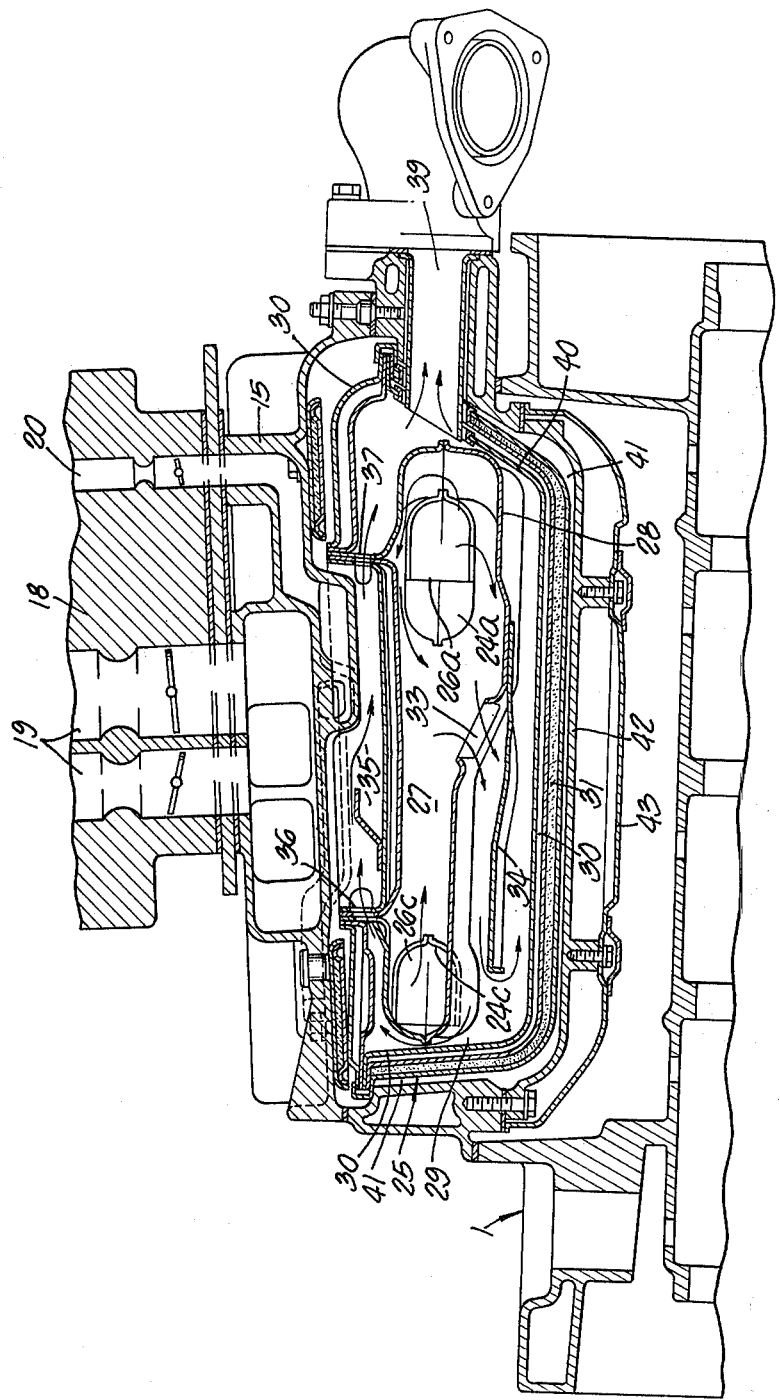
FIG. 2 is a longitudinal elevation.
Figure 3:
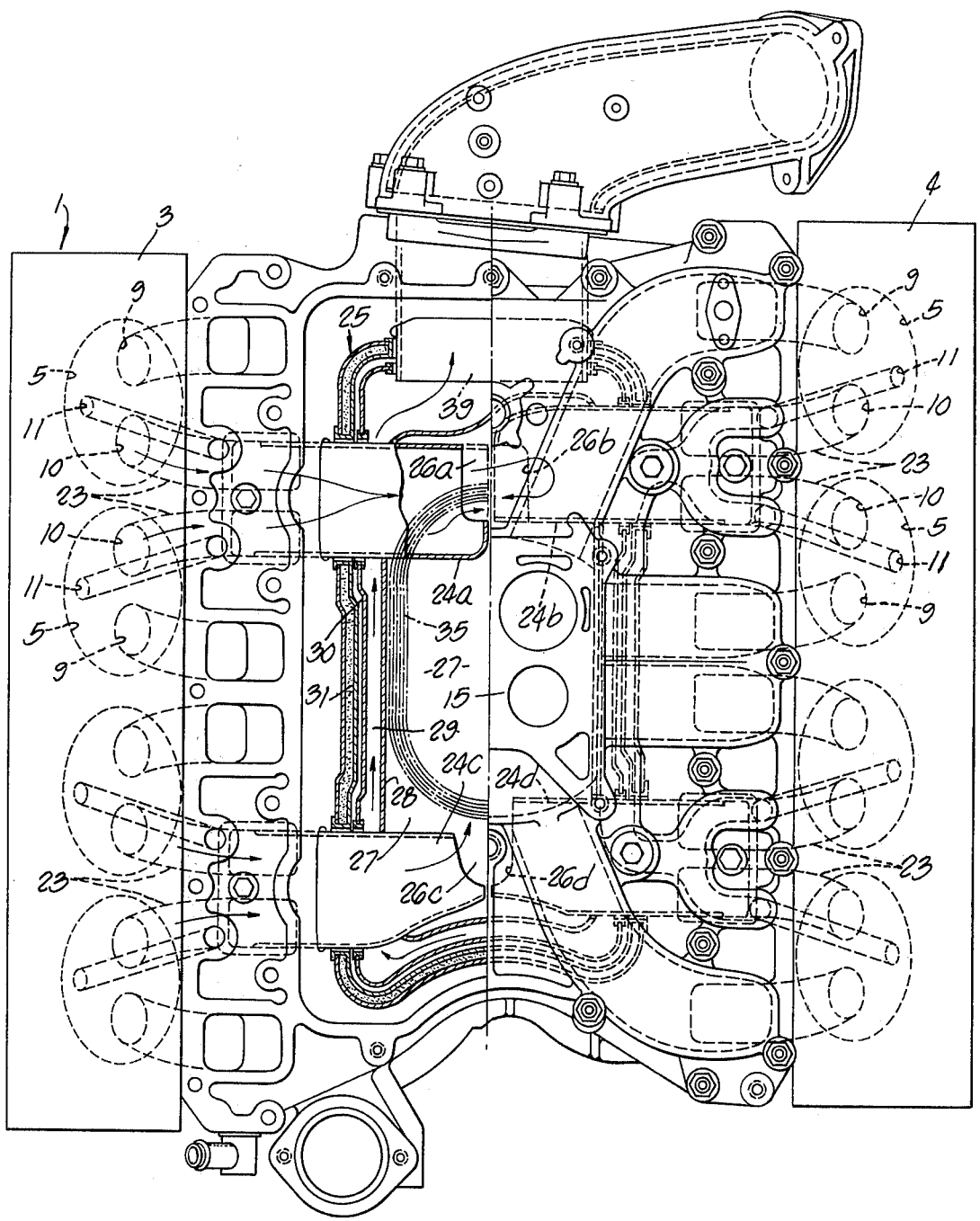
FIG. 3 is a top plan view partly in section.

As best shown in FIG. 2, the thin wall metallic liner 28 is provided with an opening 33 about midway between its ends. A flow guide plate 34 directs exhaust gases from the opening 33 toward the left end of the assembly, as viewed in FIG. 2, and the exhaust gases then pass into the second chamber 29 formed within the thin wall metallic shell 30 which encloses and surrounds the liner 28. Part of the exhaust gases then pass under the flow guide plate 34 around the outside of the liner 28 and are discharged from the exhaust reaction chamber assembly 25 through the tail pipe 39. Another part of the exhaust gases pass upward around the left end of the liner 28 and through inlet opening 36 into the cavity 35. The exhaust gases escape from the cavity 35 through the outlet opening 37 into the shell 30 and into the tail pipe 39. Exhaust gases passing through the recess 35 serve to heat the lean intake mixture and the rich intake mixture to insure vaporization. It will be noted that the exhaust gases which divide into two streams near the left end of the flow guide plate 34 are rejoined in the tail pipe 39.

A double wall casing 31 has a ceramic insulating layer confined between the two walls. This double wall casing 31 surrounds and encloses the lower portion of the thin wall shell 30 and acts to prevent escape of heat. An air space 40 is formed between the double wall casing 31 and the shell 30. Also, an air space 41 is formed between the double wall casing 31 and the three-part housing 42 which forms a part of the intake manifold 15. A thin wall metal shield 43 supported below the housing 42 provides further insulation.

The size of the passages within the exhaust reaction chamber assembly are proportioned so that the exhaust gases continually expand in a gradual fashion. Abrupt expansion of the exhaust gases is avoided in order to prevent any sharp drop in temperature of the gases.

In operation, exhaust gases from paired adjacent cylinders 2 flow through exhaust port liners 23 into a common exhaust tube 24a, 24b, 24c, 24d, in an alternate manner, because of the sequence of exhaust timing of the cylinders 2. The exhaust gases then flow partly into the first chamber 27 through the discharge openings 26a, 26b, 26c, 26d, while the remaining portion of the gases flows into the adjacent exhaust tube. It should be noted that the pairs of exhaust tubes serve as an exhaust treatment chamber in which the engine exhaust gases are subjected to moderate expansion. Since this exhaust treatment chamber is heated at all times to a high temperature by the heat of the still-burning exhaust gases, the oxidizing reaction occurs to a considerable extent even for a light load driving condition, during which the flow rate of the exhaust gases is relatively small. As the exhaust gases pass from the exhaust ports 10 into the exhaust reaction chamber assembly 25, therefore, expansion of the engine exhaust gases is effected gradually during a long residence time, so that the desired oxidation of HC and CO continues to take place to an important extent.

Dissipation of heat outside the exhaust reaction chamber assembly 25 is minimized by the multiple layers of insulating walls and the air spaces between them. Thus, the first chamber 27 within the liner 28 is surrounded by the second chamber 29 within the metal shell 30. The double wall casing 31 with ceramic insulation between its walls also provides a barrier limiting the loss of heat. The outer boundary of the exhaust reaction chamber assembly 25 is formed by the three-part housing 42 and the metal shield 43. Air spaces between the various components of the assembly contribute to minimizing the loss of heat. Because of the reliable heat-retaining properties and the thermal insulation, the exhaust reaction chamber assembly 25 operates satisfactorily to oxidize engine exhaust gases even when the engine is operating under light load conditions, during which time the exhaust gases in the assembly have a relatively low temperature as compared to conditions when the engine operates under heavy load.

It will be noted that the center portion of the intake manifold 15 has a lower portion facing the recess 35 and that a portion of the exhaust gases which pass above the liner 28 serve to heat the center portion of the intake manifold 15, thus insuring atomization or vaporization of the fuel droplets in the lean and rich mixtures. It will be appreciated that, since the exhaust gases have almost completed their residence time within the exhaust reaction chamber assembly, the amount of heat utilized for heating the intake manifold 15 does materially affect the efficiency of the oxidizing process. However, the bottom of the recess 35 shall form a double wall structure so as to accomodate the heat insulating air layer therebetween so that it may prevent heat conduction from the first chamber 27 into the recess 35.

Having fully described our invention, it is to be understood that we are not to be limited to the details herein set forth but that our invention is of the full scope of the appended claims.

We claim:

1. In a multi-cylinder internal combustion spark ignition piston engine, the improvement comprising, in combination: an exhaust reaction chamber assembly having a first reaction chamber therein, a plurality of exhaust ports each leading from a cylinder, a plurality of exhaust tubes each connected to an adjacent pair of exhaust ports, respectively, and projecting into the interior of said first reaction chamber, each exhaust tube having a discharge end in close proximity and in confronting relationship with the discharge end of an adjacent exhaust tube so that exhaust gases discharged by each exhaust tube directly enter the confronting exhaust tube and also enter into the first reaction chamber through space between the confronting ends of the discharge tubes, means forming a second reaction chamber surrounding the first reaction chamber, an opening connecting said reaction chambers, and means for discharging exhaust gases from the second reaction chamber.

2. In an internal combustion spark ignition piston engine having two banks of cylinders arranged in a V shape, the improvement comprising, in combination: an exhaust reaction chamber assembly positioned between the two banks of cylinders and having a first reaction chamber therein, a plurality of exhaust ports each leading from a cylinder, a plurality of exhaust tubes each connected to an adjacent pair of exhaust ports, respectively, and projecting into the interior of said first reaction chamber, each exhaust tube having a discharge end in close proximity and in confronting relationship with the discharge end of an adjacent exhaust tube so that exhaust gases discharged by each exhaust tube directly enter the confronting exhaust tube and also enter into the first reaction chamber through space between the confronting ends of the discharge tubes, means forming a second reaction chamber surrounding the first reaction chamber, an opening connecting said reaction chambers, and means for discharging exhaust gases from said second reaction chamber.

3. In an internal combustion spark ignition piston engine having two banks of cylinders arranged in a V shape, said cylinders each being provided with a main combustion chamber and an auxiliary combustion chamber connected by a torch opening, the improvement comprising, in combination: first passage means for supplying a lean air-fuel mixture to each of said main combustion chambers, second passage means for supplying a rich air-fuel mixture to each of said auxiliary combustion chambers, an exhaust reaction chamber assembly positioned between the two banks of cylinders and having a first reaction chamber therein, a plurality of exhaust ports each leading from a main combustion chamber, a plurality of exhaust tubes each connected to an adjacent pair of exhaust ports, respectively, and projecting into the interior of said first reaction chamber, each exhaust tube having a discharge end in close proximity and in confronting relationship with the discharge end of an adjacent exhaust tube so that exhaust gases discharged by each exhaust tube directly enter the confronting exhaust tube and also enter into the first reaction chamber through space between the confronting ends of the discharge tubes, means forming a second reaction chamber surrounding the first reaction chamber, an opening connecting said reaction chambers, means whereby at least a portion of the hot exhaust gases in said second reaction chamber may heat at least one of said air-fuel mixtures, and means for discharging exhaust gases from the second reaction chamber.

4. The combination set forth in claim 3 in which both air-fuel mixtures are heated.

5. In an internal combustion spark ignition piston engine having two banks of cylinders arranged in a V shape, the improvement comprising, in combination: an exhaust reaction chamber assembly positioned between the two banks of cylinders, said assembly being provided with a liner and having a first reaction chamber therein, a shell forming a second reaction chamber therein surrounding said liner, an opening connecting said reaction chambers, a plurality of exhaust ports each leading from a cylinder, a plurality of exhaust tubes each connected to an adjacent pair of exhaust ports, respectively, and projecting through said shell and said liner into the interior of said first reaction chamber, the exhaust tubes projecting from opposite sides of said assembly, each exhaust tube having a discharge end in close proximity and in confronting relationship with the discharge end of another exhaust tube projecting from the other side of said assembly, so that exhaust gases discharged by each exhaust tube directly enter another exhaust tube and also enter into the first reaction chamber through space between the confronting ends of the discharge tubes, and means for discharging exhaust gases from the second reaction chamber.

6. In an internal combustion spark ignition piston engine having two banks of cylinders arranged in a V shape, said cylinders each being provided with a main combustion chamber and an auxiliary combustion chamber connected by a torch opening, the improvement comprising, in combination: first passage means for supplying a lean air-fuel mixture to each of said main combustion chambers, second passage means for supplying a rich air-fuel mixture to each of said auxiliary combustion chambers, an exhaust reaction chamber assembly positioned between the two banks of cylinders, said assembly being provided with a liner having a first reaction chamber therein, a shell forming a second reaction chamber therein surrounding said liner, an opening connecting said reaction chambers, a plurality of exhaust ports each leading from a main combustion chamber, a plurality of exhaust tubes each connected to an adjacent pair of exhaust ports, respectively, and projecting through said shell and liner into the interior of said first reaction chambers, said exhaust tubes each having a discharge end in close proximity and in confronting relationship with the discharge end of another exhaust tube so that exhaust gases discharged by each exhaust tube directly enter another exhaust tube and also enter into the first reaction chamber through space between the confronting ends of the discharge tubes, means above said shell whereby hot exhaust gases in said second reaction chamber may heat at least one of said air-fuel mixtures, insulation means enclosing the lower portion of the shell, and means for discharging exhaust gases from the second reaction chamber.

* * * * *

UNITED STATES PATENT AND TRADEMARK OFFICE
CERTIFICATE OF CORRECTION

PATENT NO. : 4,034,561
DATED : July 12, 1977
INVENTOR(S) : Yoshitoshi Sakurai et al It is certified that error appears in the above—identified patent and that said Letters Patent are hereby corrected as shown below:

Column 1, line 38, between "exhaust" and "discharged" insert --gases--.

Column 4, line 5, after "does" insert --not--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*